US012790032B2

(12) United States Patent
Scheulen et al.

(10) Patent No.: US 12,790,032 B2
(45) Date of Patent: Nov. 10, 2026

(54) LAUNCH VEHICLE WITH RING BAFFLES

(71) Applicant: Blue Origin Manufacturing, LLC, Huntsville, AL (US)

(72) Inventors: Florian Scheulen, Kent, WA (US); Dean Misterek, Lakewood, CO (US); John Paul Brendel, Coeur d'Alene, ID (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/750,236

(22) Filed: Jun. 21, 2024

(65) Prior Publication Data

US 2025/0388341 A1 Dec. 25, 2025

(51) Int. Cl.
*B64G 1/40* (2006.01)

(52) U.S. Cl.
CPC .................................. *B64G 1/4021* (2023.08)

(58) Field of Classification Search
CPC ........... B64G 1/4021; F17C 2223/0161; F17C 2221/033; B64D 37/02
USPC ......................................................... 220/563
See application file for complete search history.

(56) References Cited

U.S. PATENT DOCUMENTS 3,648,886 A * 3/1972 Pringle ............ B60K 15/03177 220/900

FOREIGN PATENT DOCUMENTS

| | | | | |
|---|---|---|---|---|
| CN | 112389891 | | 2/2021 | |
| CN | 115557118 A | * | 1/2023 | ........... B65D 90/028 |
| KR | 20180060238 | | 6/2018 | |

OTHER PUBLICATIONS

Zheng, et al., Effects of Transverse Baffle Design on Reducing Liquid Sloshing in Partially Filled Tank Vehicles (2013) *College of Traffic, Jilin University, Changchun* 130022, China (14 pp).
AMR Article, Stability Replaces Slosh and Surge (Aug. 2020) *The Australian Mining Review and Austin Engg.* (5 pp).

* cited by examiner

*Primary Examiner* — Orlando E Aviles
*Assistant Examiner* — Sanjidul Islam
(74) *Attorney, Agent, or Firm* — Hogan Lovells Cadwalader US LLP

(57) ABSTRACT

A propellant tank can be used with a launch vehicle and can include at least one ring baffle having corrugated surfaces which are aligned circumferentially with respect to a longitudinal axis of the propellant tank. Folds of the corrugated surfaces may rise and fall in a first direction which is along the longitudinal axis. The ring baffle may be on an interior circumference of the propellant tank and the corrugated surfaces can extend in a second direction which is along a lateral axis of the propellant tank. Further, the ring baffle is of a predetermined width from the interior circumference of the propellant tank and can address slosh in a propellant used therein.

14 Claims, 6 Drawing Sheets

LAUNCH VEHICLE WITH RING BAFFLES

TECHNICAL FIELD

Developments herein relate generally to a system which may include space rocket components having baffles to address propellant motion.

BACKGROUND

Rocket-propelled launch vehicles have long been used to carry spacecraft into Earth orbit or beyond. The launch vehicle typically includes one or more booster stages that successively advance the spacecraft farther from the Earth's surface, ultimately separating entirely from the spacecraft, which then carries out one or more space-based missions.

The spacecraft typically includes a cargo module (e.g., a satellite, space station supplies, crew, or the like) and a service module (e.g., a propulsion system and navigation, control, and guidance systems). The service module is responsible for delivering the cargo module to its destination. In many instances, the propulsion system may be associated with a propellant tank having liquid propellant. The propellant tank may, however, be subject to loss of function from slosh loads of the propellant that may occur preflight, during flight, or in post flight conditions. Therefore, the slosh loads may include loads from liquid propellant during each one of such flight conditions, and may also include tank pressure loads, thermal loads, or fatigue or fracture. Further, the propellant tank may also have areas of pooling of the liquid propellant.

SUMMARY

In one example, a propellant tank to be used with a launch vehicle includes at least one ring baffle having corrugated surfaces thereon. The corrugated surfaces are aligned circumferentially with respect to a longitudinal axis of the propellant tank. Further, the corrugated surfaces include folds which rise and fall in a first direction. The first direction is along the longitudinal axis of the propellant tank. The at least one ring baffle is to be on an interior circumference of the propellant tank. Still further, the corrugated surfaces extend in a second direction which is along a lateral axis, relative to the longitudinal axis, and which is of a predetermined width from the interior circumference of the propellant tank.

In another example, a ring baffle to be used in a propellant tank herein includes corrugated surfaces which are aligned circumferentially with respect to a longitudinal axis of the propellant tank. Further, folds of the corrugated surfaces rise and fall in a first direction which is along the longitudinal axis. The ring baffle is to be on an interior circumference of the propellant tank. The corrugated surfaces extend in a second direction which is along a lateral axis, relative to the longitudinal axis of the propellant tank, and which is of a predetermined width from the interior circumference of the propellant tank.

In yet another example, a method for a propellant tank includes preparing ring baffles to be used in the propellant tank. The preparing step may include ensuring that individual ones of the ring baffles include corrugated surfaces which are aligned circumferentially with respect to a longitudinal axis of the propellant tank. Folds of the corrugated surfaces rise and fall in a first direction. The first direction is along the longitudinal axis of the propellant tank. Further, as part of the preparing step, the ring baffles are to be of a predetermined width with respect to an interior circumference of the propellant tank. The method includes determining locations for the ring baffles on an interior circumference of the propellant tank. The method includes installing the ring baffles at the determined locations, with the corrugated surfaces extending in a second direction which is along a lateral axis, relative to the longitudinal axis.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure. As noted above, the drawings as depicted are not necessarily drawn to scale. The relative dimensions and proportions as shown are not intended to limit the present disclosure, unless indicated otherwise. Various embodiments in accordance with the present disclosure will be described with reference to the drawings, in which:

DETAILED DESCRIPTION

Figure 1:
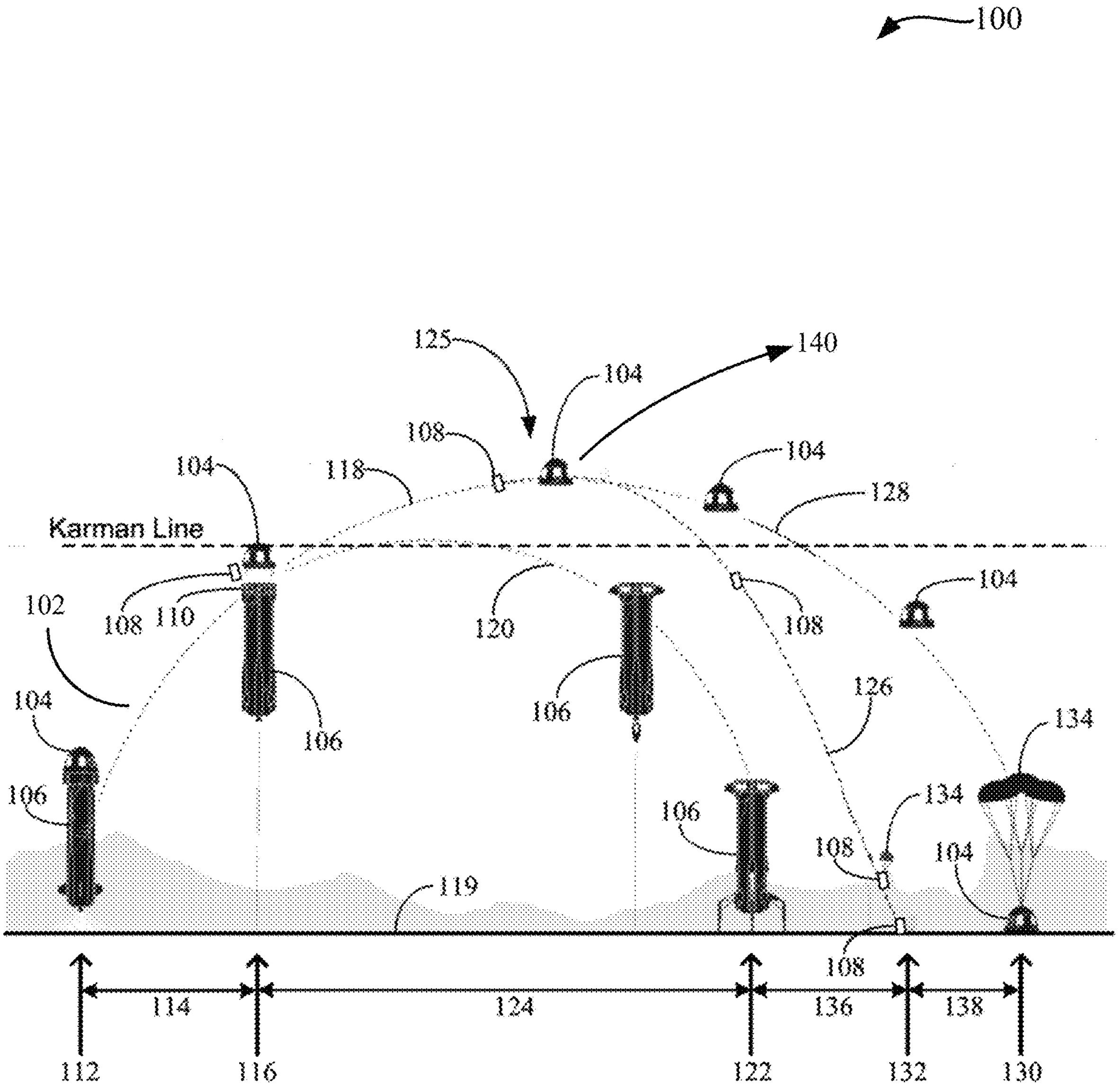
FIG. 1 illustrates an example flight sequence using a space rocket having at least one system to be subject to ring baffles described in one or more of FIGS. 2-6 herein, according to at least one embodiment.

As used herein, a propellant tank is a cylindrical structure which may be pressurized and temperature controlled and may include at least one inlet and outlet feature. The cylindrical structure is subject to propellant loads in a vertically aligned or substantially vertically aligned position with respect to a surface of a launch pad. As used herein, a ring baffle is an annular structure which may include multiple sections and may be around an interior circumference of the cylindrical structure. As used herein, the ring part of the ring baffle may be in reference to the annular structure having a predetermined width from the interior circumference of a cylindrical structure, where the predetermined width is necessarily less than a radius of the cylindrical structure. Therefore, the ring baffle does not extend fully across a diameter of the cylindrical structure. As used herein, the baffle part of the ring baffle is in reference to the annular structure having ability to receive slosh loads of the propellant which may occur preflight, during flight, or post flight conditions. There may be multiple such ring baffles on an interior circumference of the propellant tank.

Further, the ring baffle may be removably associated with the interior circumference through one or more of spine sections or strut sections. Still further, the ring baffle may include corrugated surfaces which are aligned circumferentially with respect to a longitudinal axis of the propellant tank. As used herein, a corrugated surface is in reference to a surface having at least two folds, such as at least one set of a crest and a trough. Corrugated surfaces is in reference to more than two folds and multiple sets of crests and troughs. The corrugated surfaces rise and fall in a first direction which is along the longitudinal axis of the propellant tank. Further, the corrugated surfaces extend in a second direction which is along a lateral axis, relative to the longitudinal axis of the propellant tank. For example, the corrugated surfaces extend radially, towards a center of the propellant tank, but do not extend to close the diameter of the propellant tank. Therefore, the corrugated surfaces extend to a predetermined width from the interior circumference of a propellant tank.

The corrugated surfaces may be provided on different corrugated sections with a spine section having a strut section therebetween. As used herein, a corrugated section may be a quadrilateral shape and may have a first dimension which is along the lateral axis and a second dimension which is along a tangential axis, relative to a circumference of the cylindrical structure. For example, a corrugated section may be a rectangle or a square shape. As used herein, a tangential axis is an axis relating to tangent of a circumference of the cylindrical structure. Therefore, more often, the tangential axis is normal or perpendicular to a lateral axis. As used herein, a spine section may be narrower, relative to the second dimension of the corrugated section. The spine section may be a flat surface, relative to the corrugated surfaces. However, the spine section may also extend in the manner of the corrugated surfaces. As used herein, the strut section is an angled stiff structure which may be associated, at its distal end, with a distal end of the spine section, and may be associated, at its proximal end, with an interior circumference of the cylindrical structure. The association between the spine section and the interior circumference of the cylindrical structure is a removable association. This allows removal and replacement of individual corrugated sections of a ring baffle. A proximal end of the strut section may also be associated with the interior circumference of the cylindrical structure. Further, the distal sides of the spine section and the spine section may be associated together in a rotatable manner.

Therefore, the ring baffle herein enables no loss of function from slosh loads, which may occur preflight, during flight, or post flight conditions. The ring baffle herein is also able to address different flight conditions, pressure loads, thermal loads, or fatigue or fracture. Further, the ring baffle herein ensures that a propellant tank does not have areas of pooling of a propellant. The ring baffle herein maintains electrical bonds across joints and may be constructed of materials which are compatible with liquid oxygen (LOX), liquid hydrogen (LH2 or H2(l)) based propellant products, and liquified natural gas (LNG).

FIG. 1 illustrates an example flight sequence 100 using a space rocket having at least one system to be subject to ring baffles described in one or more of FIGS. 2-6 herein, according to at least one embodiment. Instead of a space rocket, however, the ring baffles herein may be used with any other application which may include non-space applications involving liquid propellant or fuel which may be for storage or use purposes. The ring baffles may be part of a propellant tank which is associated with a space rocket. For example, the propellant tank may be associated, in part, with a propulsion module (or booster) 106 which is subject to hot-fire testing or a space mission.

The flight sequence 100 is illustrated with respect to at least one re-entry capsule 104 atop of a propulsion module 106, which may be part of a launch or space vehicle. The re-entry capsule 104 may include a parachute system. The parachute system is stored during launch an ascent and activated during a descent. In one example, the parachute system includes a one or more, or a cluster of parachutes 134. A container having the parachute may be provided as part of the re-entry capsule 104. Further, the container is positioned to allow a specific direction of loading thereon, with respect to the re-entry capsule 104. The re-entry capsule 104 is part of a flight 102 of a propulsion module 106 and may include a crew capability (such as, being a launch or space vehicle). There may be a further re-entry capsule for other components which may be ejected or dispensed from one or more of the propulsion module 106 or a first re-entry capsule 104. For example, a further re-entry capsule 104 may include or be an analog-to-digital converter (ADC) which is to provide data acquisition from the flight 102.

The flight 102 may be a same or a similar flight of the New Shepard® suborbital launch or space vehicle by Blue Origin®. Further, while illustrated to perform re-entry from just beyond the Karman line, the re-entry capsule herein may be one that, without limitations, docks with a space station or performs space-related investigations, prior to re-entry and landing back on Earth's surface. The Karman line may be a reference point for an internationally recognized boundary of space which may be 100 kilometers or 330,000 feet above Earth's mean sea level.

In preparation for flight operations, preflight activities may be performed, which may include loading of satellites and other components, including an ADC 108, into a dispenser 110, and of the re-entry capsule to the propulsion module 106. The dispenser 110 may be located a top portion of the propulsion module 106. The preflight activities may also include propellant handling, loading, and other related operations pertaining to a propellant tank of the propellant module 106. The flight 102 may begin with liftoff of re-entry capsule 104 and propulsion module 106 at a first time 112. Minutes later, such as, after a first time span 114 and at a second time 116, the re-entry capsule 104 separates from propulsion module 106.

At or near a second time 116 (e.g., just prior to, during, or just after rocket portion separation), a dispenser 110 may eject the ADC 108 and other components, if loaded and available therein, so that the ADC and the other components have the same or similar speed and trajectory (e.g., velocity) as re-entry capsule 104, which continues to climb past the Karman line. The ADC 108 and re-entry capsule 104 both travel along a trajectory 118 which allows for delayed re-entry or along any other trajectory (indicated by an arrow 140) for purposes of docking with a space station or performing other space-related investigations prior to re-entry. Meanwhile, the propulsion module 106 falls back to Earth's surface 119, along a trajectory 120, in a booster re-entry phase, eventually landing at third time 122.

Further, a second time span 124 pertains to when the re-entry capsule 104 and ADC 108 eventually reach apogee (e.g., their maximum distance from Earth), as indicated by arrow 125, during free-flight (e.g., sans rocket propulsion) in micro-gravity (hereinafter referred to by the approximation "zero-gravity"). Although, for other trajectories there may be more time required to reach a suitable orbit or path to continue docking with a space station or performing other space-related investigations prior to re-entry. For example, a satellite may be enabled, using the illustrated other trajectory 140, to reach a suitable orbit. For at least the second time span 124, an ADC 108 may continue to be within a relatively close distance from re-entry capsule 104. In one example, this distance may be less than 5 or 6 meters but could be other suitable distances based at least in part on the application. Both, an ADC 108 and re-entry capsule 104 may be in zero-gravity for several minutes before falling back towards Earth and out of zero-gravity. However, some other components need not reach the zero-gravity threshold. The time period of several minute in zero-gravity is referred to herein as free-flight. After this period, both ADC 108 and re-entry capsule 104 begin to fall toward Earth and begin to encounter atmospheric drag.

An ADC 108 may have a ballistic coefficient (e.g., 0.6 pounds per square inch (lb/in2)) greater than that of re-entry capsule 104 to ensure that no in-flight contact can occur during re-entry. The ADC 108 may be configured to land before re-entry capsule 104, to also ensure no in-flight contact. Although for other components landing or re-entering after performing docking, investigations, other space missions, the landing herein may be directed to a single re-entry capsule or other singular component. The ADC 108, having a ballistic coefficient greater than that of re-entry capsule 104, may follow a trajectory 126 which is substantially different from a trajectory 128 than the re-entry capsule 104. These two trajectories may lead to an increasing separation distance and help to prevent the possibility of a collision between the two objects.

Flight 102 ends when re-entry capsule 104 or other component, travelling along trajectory 128, lands on Earth's surface 119 at first landing time 130. The ADC 108, travelling along trajectory 126, lands on Earth at second landing time 132. Each of the re-entry capsule 104 and the ADC 108 may use one or more parachutes 134 as part of a parachute system to slow their descent. A further time span 136 may separate the landing times of the propulsion module 106 and the ADC 108. Yet another time span 138 may further separate the landing times of the ADC 108 and of the re-entry capsule 104.

A re-entry capsule 104 may be used to carry equipment to and from space, samples to space, samples from space, or crew or passengers. The re-entry capsule 104 may be autonomously or remotely controlled so that only passengers are on board without the passengers requiring to control the re-entry capsule 104. Thus, the flight 102 and the re-entry capsule 104 may be configured for any suitable space mission, including for docking with a space station, for space investigation, sample recovery, deep space travel and return, space tourism, and rendering photography. Further, for all such space missions which may or may not require re-entry of a propulsion module 106, there should be no loss of function from slosh loads of an associated propellant tank. For example, during one or more of such time spans 114-138, the propellant within a propellant tank may move around and may be subject to damping requirements. However, damping of propellant may impart pressure loads onto baffle, forming one aspect of the slosh loads. Further, the pressure loads may be treated as a pressure distribution on the ring or annular baffle. The pressure loads may be a function of one or more of baffle size, slosh frequency, wave angle, or a propellant density.

Figure 2:
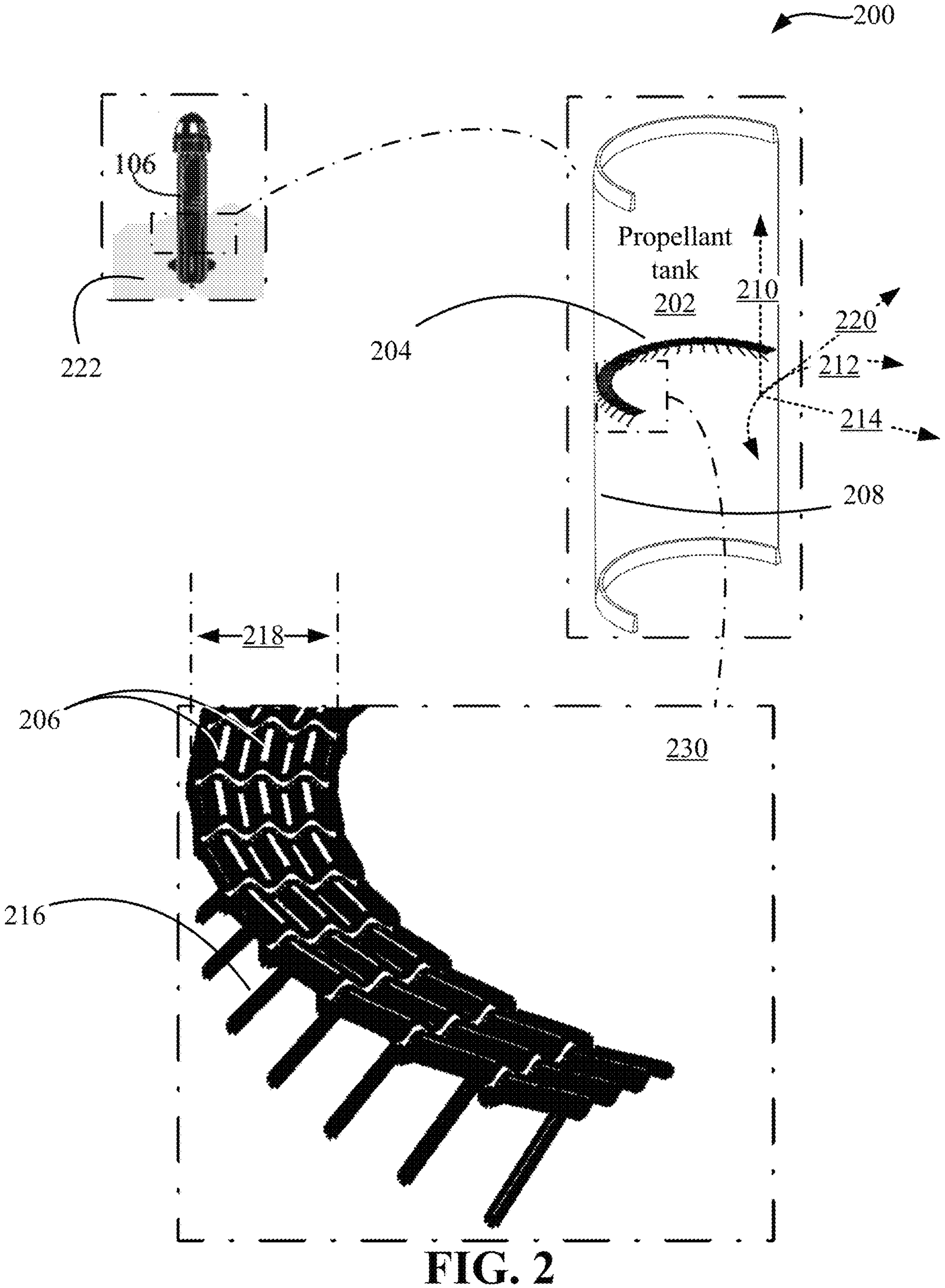
FIG. 2 illustrates aspects of a ring baffle used in a propellant tank, according to at least one embodiment.

FIG. 2 illustrates aspects 200 of a ring baffle used in a propellant tank, according to at least one embodiment. The propellant tank 202 may be used with a propellant module 106 of a launch vehicle. The propellant tank 202 at least one ring baffle 204. However, as detailed further with respect to at least FIG. 4, there may be typically more than one ring baffle in a propulsion module 106. Each ring baffle 204 includes a number of corrugated surfaces 206. The corrugated surfaces 206 may be aligned circumferentially 212, such as on an interior circumference 208 of the propellant tank 202. The circumferential alignment may be with respect to a longitudinal axis 210 of the propellant tank 202.

Further, folds of the corrugated surfaces 206 may rise and fall in a first direction which is along the longitudinal axis 210. Also, as illustrated, the corrugated surfaces 206 extend in a second direction which is along a lateral axis 214, relative to the longitudinal axis 210. The corrugated surfaces 206 extend to a predetermined width 218 from the interior circumference 208 of the propellant tank 202. The predetermined width 218 may be based on one or more of a type of the propellant, a diameter of the propellant tank, an intended stiffness of the ring baffles, a distance between the ring baffles, or a use case, in one example. Further, each ring baffle 204 may not engage the interior circumference 208 of the propellant tank 202. Instead, there may be support structures 216, as detailed further with respect to at least FIG. 3, which engage with the interior circumference 208 of the propellant tank 202.

FIG. 2 also illustrates, in call-out 230, that there may be multiple corrugated sections, each having a respect part of the corrugated surfaces 206. Each corrugated section may be a quadrilateral shape and may have a first dimension which is along the lateral axis 214 and a second dimension which is along a tangential axis 220, relative to a circumference of the cylindrical structure. For example, a corrugated section may be a rectangle or a square shape, as detailed further with respect to FIG. 3. The support structures 216 may include a spine section. The tangential axis 220 is a straight line and does not require that the second dimension be curved. However, warping or curving of the corrugated sections is possible and can still provide the benefits described using the ring baffle herein.

Further, as illustrated in FIG. 2, the propellant tank 202 is subject to propellant loads in a vertically aligned or substantially vertically aligned in position with respect to a surface of a launch pad 222. For example, the propellant tank 202, together with the propellant module 106 may remain vertically aligned or substantially vertically aligned in position in preflight, during flight, or in post flight conditions. Therefore, the ring baffles 204 herein is also able to address different flight conditions, pressure loads, thermal loads, or fatigue or fracture, from substantially vertical loads on the ring baffles 204. In addition, the ring baffle 204 herein ensures that a propellant tank does not have areas of pooling of a propellant when in the vertically aligned or substantially vertically aligned position.

Figure 3:
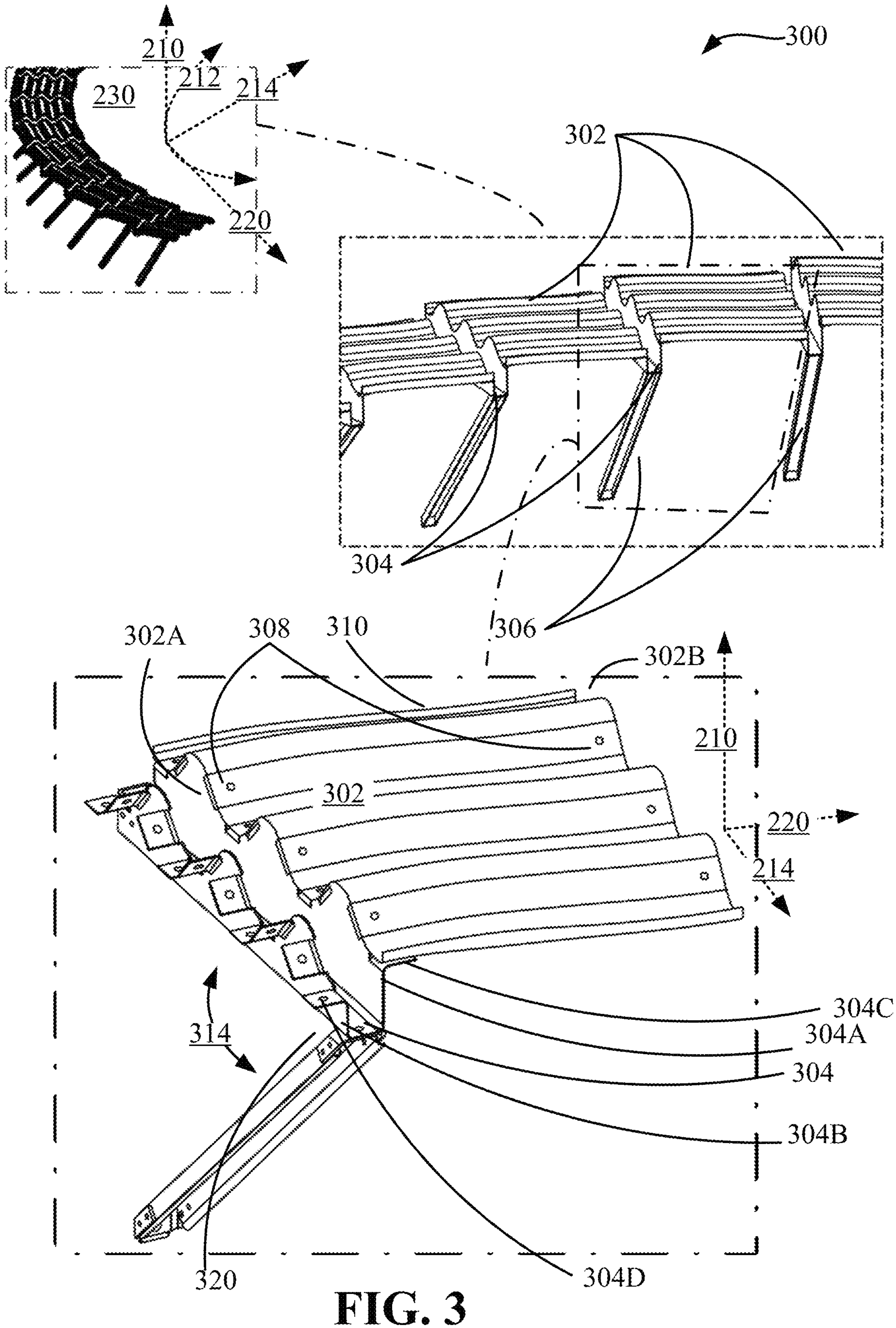
FIG. 3 illustrates details of various sections of a ring baffle used in a propellant tank, according to at least one embodiment.

FIG. 3 illustrates details 300 of various sections of a ring baffle used in a propellant tank, according to at least one embodiment. For example, FIG. 3 details a part of the call-out 230 of FIG. 2. The ring baffle 204 may include multiple corrugated sections 302. These corrugated sections 302 may all be of a quadrilateral shape. As illustrated, the corrugated sections 302 may all be of a same or similar rectangle or square shape. Therefore, the corrugated sections 302 may each have a first dimension which is along the lateral axis 214 and a second dimension which is along a tangential axis 220. The tangential axis 220 is relative to a circumference of the cylindrical structure forming the propellant tank 202. Therefore, the tangential axis 220 changes along the circumference, but provides reference to the layout of the corrugated sections 302.

Each ring baffle 204 may be associated with a spine section 304 which may be narrower, relative to the second dimension of the corrugated section 302. The spine section 304 may be a flat surface, relative to the corrugated surfaces 206. However, like the corrugated surfaces 206, the spine section 304 may extend laterally inwards from the interior circumference 208 of the propellant tank 202. Each ring baffle 204 may also be associated with a strut section 306. The strut section 306 is an angled stiff structure which may be associated, at its distal end, with a distal end of the spine section 304. At a proximal end of the spine section 304, however, there may be a removable association between the spine section 304 and the interior circumference 208 of the cylindrical structure forming the propellant tank 202. A proximal end of the strut section 306 may also be associated with the interior circumference 208 of the cylindrical structure forming the propellant tank 202. Further, the distal sides of the spine section 304 and the strut section 306 may be associated together in a rotatable manner. The spine section 304 and the strut section 306 form the support structures 216 for the corrugated sections 206.

FIG. 3 also illustrates that a propellant tank 202 may have its corrugated surfaces provided in individual corrugated sections 302, which are associated together via the spine section 304 using provided attachment points 312. For example, each spine section 304 is a U-shaped structure with two side walls 304A, 304B and a drainage area in the center. However, the side walls may be associated with tabs 304C, 304D. One set of tabs 304C may include its own attachment points which are associated with attachment points 308 of one corrugated section 302 on one side and a second set of tabs 304D may include its own attachment points on an opposite side and which are associated with attachment points of a second corrugated section. Further, the side walls 304A, 304B may be such that one side wall 304A is higher relative to the other side wall 304B. This is so that individual corrugated sections 302 are provided with an incline which is along a tangential axis 220 relative to the interior circumference 208 of the propellant tank 202. The incline is to support drainage of propellant to a drainage area which is in the center of the U-shaped spine section 304, between adjacent ones of the individual corrugated sections 302.

Further, the tabs 304C, 304D may be such that they provide an incline for the spine section 304, from the interior circumference 208 and along the lateral axis 214 of the propellant tank 202. In one example, a center of the spine section 304 is inclined but the tabs 304C; 304D on either side are level with respect to the side they are on. This is so that there is no warp in the corrugated section 302 once it is associated with the spine section on either side. However, it is possible that the spine is inclined at the center because the tabs 304C; 304D on either side are inclined with respect to the side they are on. This enables a warp in the corrugated section 302 once it is associated with the spine section. In either case, the propellant drains from the first side 302A of the corrugated section 302 to the second side 302B of the corrugated section, and drains further through the center of the spine section 304.

The attachment points 308 may be pass-through holes to receive and retain rivets through a corrugated section and through a spine. The attachment points are, therefore, provided on both sides of the spine section 304 and on both sides of a corrugated section 302. This allows coupling of a corrugated section 302 to two different spine sections 304 on its sides. For example, a first side 302A and a second side 302B of each of the corrugated sections 302 have the attachment points 308 and these sides are located in reference to a tangential axis 220 of the corrugated section 302, relative to the interior circumference 208 of the propellant tank 202. Further, a lateral end 310 of a corrugated section 302 which is closer to the interior circumference 208 of the propellant tank 202 may not touch the interior circumference 208 of the propellant tank 202.

The corrugated surfaces in individual corrugated sections 302 are associated together by the spine section 304 which also comprises or is associated with a strut section 306. The strut section 306 may be rotatable 314 about the longitudinal axis 210, in part due to a rotational joint 320 provided between the strut section 306 and the spine section 304. This allows for adjustment of the strut section 306 against the interior circumference 208 of the propellant tank 202. Therefore, the strut section 306 may be removably associated with the interior circumference 208 of the propellant tank 202. For example, the strut section 306 is associated to the spine section 304 via a bolt or rivet. However, the strut section 306 is associated to the interior circumference 208 of the propellant tank 202 via a bolt. Similarly, at least one tab of the spine section 304 may be removably associated to the interior circumference 208 of the propellant tank 202.

Further, instead of rivets, all the attachment points may be bolted or removably associated in any manner to allow disassembly and replacement of any of a corrugated section 302, a spine section 304, or a strut section 306. All of this allows at least for removal and replacement of a corrugated section 202 by removal of bolts at least at the interior circumference 208 of the propellant tank 202 and at a strut section 306. One or more of the corrugated surfaces or support sections (such as the strut section or the spine section) may include one or more of a metal material, a plastic material, or a composite material. At least the metal material may be aluminum.

Figure 4:
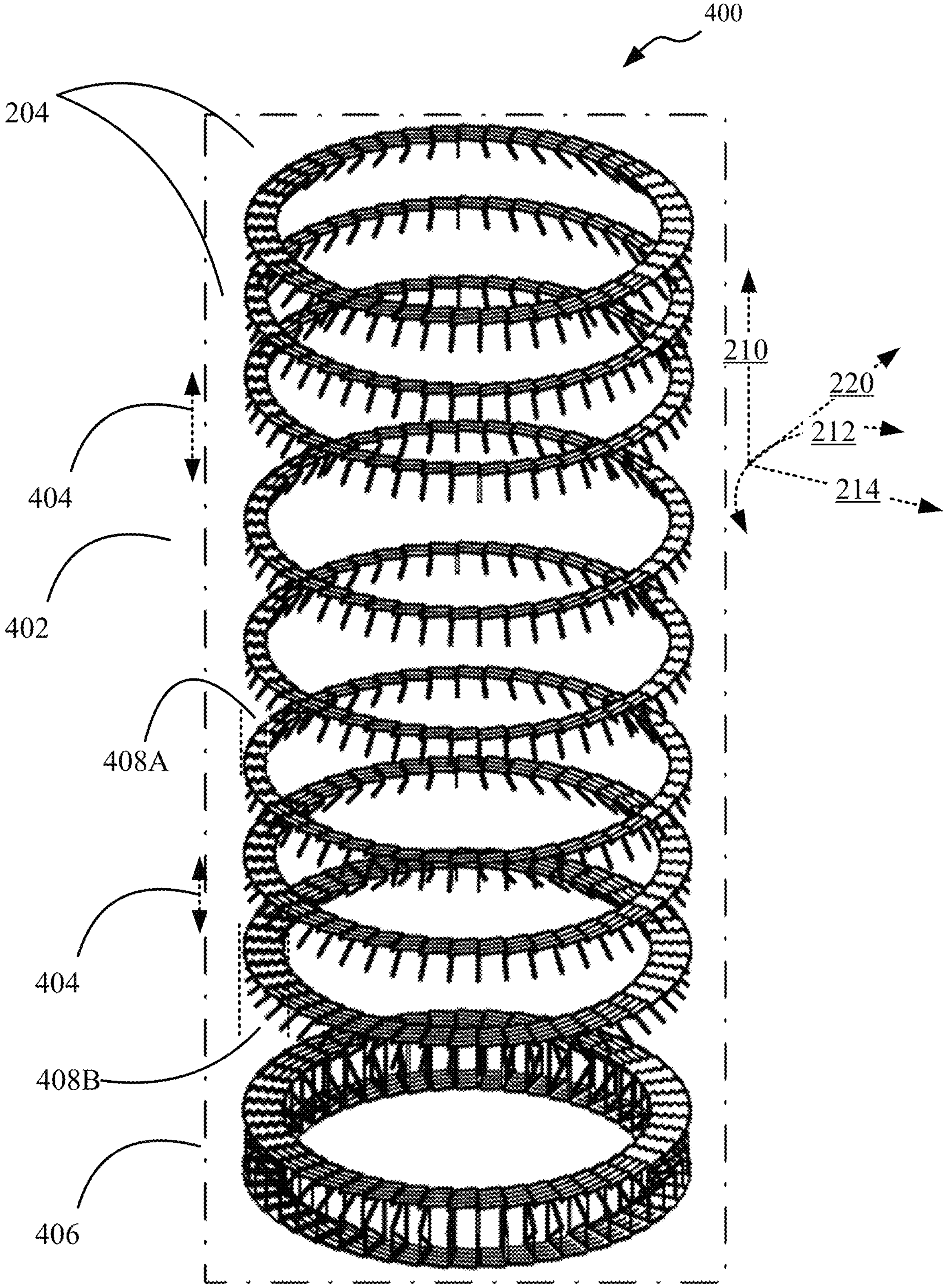
FIG. 4 illustrates aspects of locations of ring baffles used in a propellant tank, according to at least one embodiment.

FIG. 4 illustrates aspects 400 of locations of ring baffles used in a propellant tank, according to at least one embodiment. For example, there may be multiple ring baffles 204 used in a propellant tank 202. The ring baffles 204 used with the strut section and the spine section can enable a stiffness in the ring baffles. As a result, the shape of the ring baffle with the support section represents a bolted Z stiffener. One or more of the of the corrugated surfaces or support sections may be machined components. Further, a rotatable association between the strut section and the spine section may be a Clevis joint.

A determination may be made of a type of propellant to be used with the propellant tank. For example, the ring baffles may be used with at least LOX or LNG propellants. Based at least in part on the type of propellant, a determination of the locations 402 of the of ring baffles 204 may be provided. The ring baffles 204 are then associated at the locations 402, prior to use of the propellant tank. In one example, there may be a maximum and a minimum of separations 404 between the ring baffles 204. The separations 404 are spatial separations that may along a longitudinal axis 210 of the propellant tank. For example, there may be more ring baffles when LOX is the type of propellant used, relative to LNG. Further, there may be more separations 404 between the ring baffles in the LOX case than in the LNG case. This difference may be based in part on the pressures associated with the type of propellant.

At least at a top or at a bottom of a propellant tank 202, a combination of two ring baffles 406 may be provided in opposing directions, such as with one ring baffle facing downwards and with one ring baffle facing upwards. As such, the strut sections may overlap or be provided adjacent to each other at a height or depth of the interior circumference 208 of the propellant tank 202. Further, the ring baffles may have differing widths 408A, 408B all throughout the propellent tank 202. Although, it is possible to have a singular width for each propellant tank. In at least one embodiment, however, a width of a ring baffle may be dependent on the type of fuel. For example, for LOX as a fuel in a propellant tank, the ring baffles used in the tank may have a predetermined width range that may be wider than those ring baffles used in a propellant tank for LNG as a fuel.

Still further, the propellant tank may have provided attachment points all throughout an interior circumference, at different locations but which are circumferentially separated in equal spatial separations. This allows for the propellant tank to be used with any suitable propellant but attaching the ring baffles which is suitable to the propellant. However, it is possible to use a fixed set of attachment points for predetermined use cases of the propellant tank, which may be either for LOX or LNG.

Figure 5:
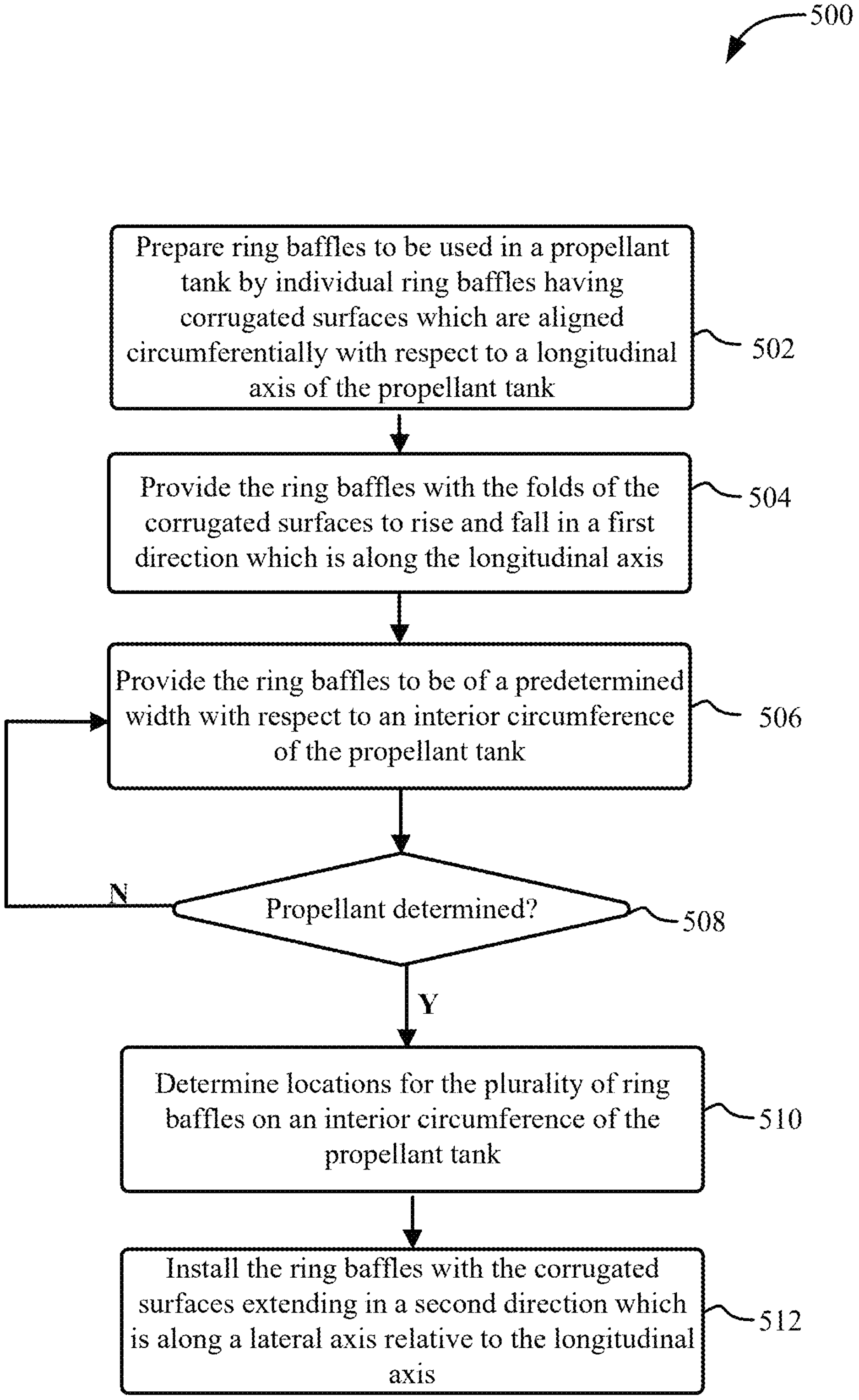
FIG. 5 illustrates a method associated with a use or manufacture of ring baffles for a propellant tank, according to at least one embodiment.

FIG. 5 illustrates a method 500 associated with a use or manufacture of ring baffles for a propellant tank, according to at least one embodiment. The method 500 includes preparing 502 ring baffles to be used in the propellant tank. For example, the preparing 502 step may include, for individual ones of the ring baffles, to have corrugated surfaces which are aligned circumferentially with respect to a longitudinal axis of the propellant tank. The method 500 may include providing 504 the ring baffles with folds of the corrugated surfaces which rise and fall in a first direction which is along the longitudinal axis. For example, the providing 504 step may be performed in accordance with the alignment intended in the preparing 502 step. A further providing 506 step may be for the ring baffles to be of a predetermined width with respect to an interior circumference of the propellant tank. This further providing 506 step may be also performed in accordance with the alignment intended in the preparing 502 step.

In one example, however, there may be many ring baffles prepared and the providing step may be to ensure selection of ring baffles of the many prepared ring baffles, based in part on a use case or a type of propellant intended for the propellant tank. Therefore, a separate verification or determining 508 step of the method 500 may be directed to the propellant to be used in the propellant tank.

The method 500 may include determining 510 locations for the ring baffles on an interior circumference of the propellant tank. The method may then include installing 512 the ring baffles at the determined locations. This is so that the corrugated surfaces extend in a second direction which is along a lateral axis, relative to the longitudinal axis, which is as per the alignment in the preparing 502 step, for instance. Further, the determining 510 step for the locations may be performed along with, or in a different order, with respect to the providing 505, 506 steps of the method 500. In one example, at least the determining 510 step for the locations of the ring baffles may be based in part on the type of propellant.

Figure 6:
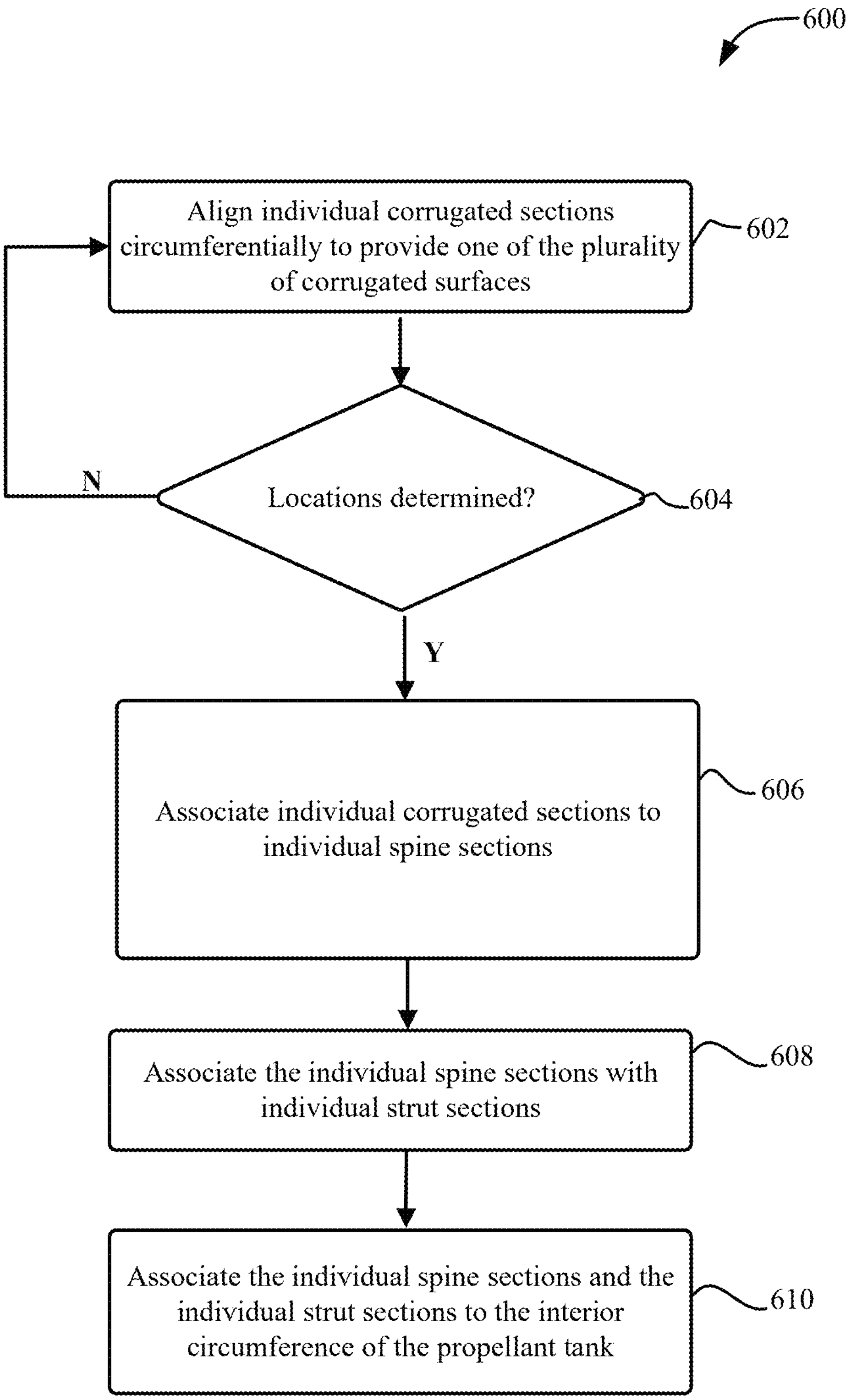
FIG. 6 illustrates a further method associated with a use or manufacture of ring baffles for a propellant tank, according to at least one embodiment.

FIG. 6 illustrates a further method 600 associated with a use or manufacture of ring baffles for a propellant tank, according to at least one embodiment. This further method 600 may be used with or separately from the method 500 of FIG. 5. For example, the method 600 of FIG. 6 may include, as part of the installing 512 step of the method 500 in FIG. 5, an aligning 602 step for individual corrugated sections which are to be circumferential and which are to provide one of the corrugated surfaces of the method 600. In at least one example, a single crest and trough of a corrugated section may be a single corrugated surface. However, it is also possible the all the crests and troughs of a single corrugated section may be a single corrugated surface.

The method 600 in FIG. 6 may include verifying 604 that the locations for the installing 512 step of the method 500 in FIG. 5 are determined. The method 600 in FIG. 6 may include associating 606 the individual corrugated sections to individual spine sections. For example, the associating 606 step may use attachment points which are at a first end and a second end of the individual corrugated sections. The method 600 in FIG. 6 may include ensuring that the first end and the second end of the individual corrugated sections are along a tangential direction relative to the interior circumference of the propellant tank.

The method 600 in FIG. 6 may include associating 608 the individual spine sections with individual strut sections. The method 600 in FIG. 6 may include associating 610 the individual spine sections and the individual strut sections to the interior circumference of the propellant tank. The associating 608, 610 steps may include ensuring that the alignment in step 502 is being followed and that the locations determined are where the associating 608, 610 steps are being applied. Therefore, one or more of the methods 500, 600 may include a further step or may include a sub-step for associating the individual spine sections and the individual strut sections to the interior circumference of the propellant tank at a predetermined one of the locations based in part on a type of the propellant.

Further, one or more of the methods 500, 600 may include a further step or may include a sub-step for preparing the individual corrugated sections with a respective incline which is along a tangential direction relative to the interior circumference of the propellant tank. The incline can support drainage of the propellant to a drainage area which is between adjacent ones of the individual corrugated section. In one example, one or more of the installing 512 step or the associating 606 step may include using tabs of different heights, along a lateral axis and at a spine section of an individual corrugated section, to provide the incline for at least one of the individual corrugated section. Then, adjacent ones of the individual corrugated section may drain into its own spine section or its neighboring spine section.

In addition, one or more of the methods 500, 600 may include a further step or may include a sub-step for aligning individual corrugated sections circumferentially to provide one of the corrugated surfaces. For example, this aligning may be by the respective incline to occur towards an individual one of a plurality of spine sections to support drainage of propellant towards the plurality of spine sections. For example, this include may be along a tangential axis of individual corrugated sections, and which is along a straight line without requiring that a length of an individual corrugated section be curved. However, it is possible to provide warping or curving of the individual corrugated section to provide the incline and to still achieve the benefits described using the ring baffle herein.

Therefore, one or more of the methods 500, 600 may include a further step or may include a sub-step for associating the individual corrugated sections with individual spine sections using tabs of varying heights at one end of the individual corrugated sections. However, it is also possible to provide the spine section with an incline by the spine section having the tabs of varying heights. When the spine section is part of an individual corrugated section, the tabs at the end of the individual corrugated sections are part of the spine section of the individual corrugated sections. The tabs of varying heights can support a respective incline within the individual spine sections.

One or more of the methods 500, 600 may include a further step or may include a sub-step for aligning individual corrugated sections circumferentially to provide one of the corrugated surfaces by aligning the respective incline towards individual spine sections to support drainage which is along the lateral axis for the propellant. This drainage may be in the individual spine sections, which may be different from the drainage within the corrugated surfaces and which may be along a tangential axis. Therefore, the slosh loads that may occur within a propellant tank having such ring baffles may dampened or reduced. This may include loads from liquid propellant during each one of different flight conditions described throughout herein. For example, the loads addressable by the ring baffles herein include tank pressure loads, thermal loads, or fatigue or fracture. Further, the propellant tank having such ring baffles will not support pooling of the liquid propellant in areas of at least the ring baffles.

Other variations are within spirit of present description. Thus, while the described techniques are susceptible to various modifications and alternative constructions, certain illustrated embodiments thereof are shown in drawings and have been described above in detail. It should be understood, however, that there is no intention to limit description to specific form or forms described, but on contrary, intention is to cover all modifications, alternative constructions, and equivalents falling within spirit and scope of description, as defined in appended claims.

Use of terms “a” and “an” and “the” and similar referents in context of describing embodiments (especially in context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. “Connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term “set” (e.g., “a set of items”) or “subset” unless otherwise noted or contradicted by context, is to be construed as a nonempty collection comprising one or more members. Further, unless otherwise noted or contradicted by context, term “subset” of a corresponding set does not necessarily denote a proper subset of corresponding set, but subset and corresponding set may be equal.

Conjunctive language, such as phrases of form “at least one of A, B, and C,” or “at least one of A, B and C,” unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases “at least one of A, B, and C” and “at least one of A, B and C” refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term “plurality” indicates a state of being plural (e.g., “a plurality of items” indicates multiple items). In at least one embodiment, number of items in a plurality is at least two, but can be more when so indicated either explicitly or by context. Further, unless stated otherwise or otherwise clear from context, phrase “based on” means “based at least in part on” and not “based solely on.”

Use of any and all examples, or exemplary language (e.g., “such as”) provided herein, is intended merely to better illuminate embodiments of the description and does not pose a limitation on scope of description unless otherwise claimed. No language in specification should be construed as indicating any non-claimed element as essential to practice of the description.

Although descriptions herein set forth example implementations of described techniques, other architectures may be used to implement described functionality, and are intended to be within scope of this description. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are described as exemplary forms of implementing the claims.

What is claimed is:

1. A propellant tank to be used with a launch vehicle, the propellant tank comprising: at least one ring baffle comprising a plurality of corrugated surfaces which are aligned circumferentially with respect to a longitudinal axis of the propellant tank, wherein folds of the plurality of corrugated surfaces rise and fall in a first direction which is along the longitudinal axis, wherein the at least one ring baffle is to be on an interior circumference of the propellant tank, wherein the plurality of corrugated surfaces extend in a second direction which is along a lateral axis, relative to the longitudinal axis, and which is of a predetermined width from the interior circumference of the propellant tank, and wherein the plurality of corrugated surfaces are comprised in individual corrugated sections which are associated together by a spine section which comprises a strut section.

2. The propellant tank of claim 1, wherein the propellant tank is subject to propellant loads in a vertically aligned or substantially vertically aligned position with respect to a surface of a launch pad.

3. The propellant tank of claim 1, wherein the individual corrugated sections comprise attachment points which are at a first end and a second end along a tangential direction relative to the interior circumference of the propellant tank.

4. The propellant tank of claim 1, wherein the strut section is an angled stiff structure with respect to the individual corrugated sections, is associated with the spine section at a distal end of the struct section, and is associated with the interior circumference of the propellant tank at a proximal end of the struct section.

5. The propellant tank of claim 1, wherein the spine section comprises a drainage area to support drainage along the lateral axis.

6. The propellant tank of claim 1, wherein the individual corrugated sections comprise an incline which is along a tangential direction relative to the interior circumference of the propellant tank, the incline to support drainage of a propellant to a drainage area which is between adjacent ones of the individual corrugated sections.

7. The propellant tank of claim 1, wherein the strut section is rotatable about the longitudinal axis and is removably associated with the interior circumference of the propellant tank.

8. The propellant tank of claim 1, wherein the spine section is a flat or corrugated and is removably associated with the interior circumference of the propellant tank.

9. The propellant tank of claim 1, wherein one or more of the plurality of corrugated surfaces, the spine section, or the strut section comprises one or more of a metal material, a plastic material, or a composite material.

10. The propellant tank of claim 1, wherein the at least one ring baffle comprises a plurality of ring baffles with one or more spatial separations therebetween, the one or more spatial separations along the longitudinal axis of the propellant tank.

11. A ring baffle on an interior circumference in a propellant tank, the ring baffle comprising a plurality of corrugated surfaces which are aligned circumferentially with respect to a longitudinal axis of the propellant tank, wherein folds of the plurality of corrugated surfaces rise and fall in a first direction which is along the longitudinal axis, wherein the corrugated surfaces extend in a second direction which is along a lateral axis, relative to the longitudinal axis, and which is of a predetermined width from the interior circumference of the propellant tank, and wherein the individual corrugated sections which are associated together by a spine section which comprises a strut section.

12. The ring baffle of claim 11, wherein the individual corrugated sections comprise attachment points which are at a first end and a second end along a tangential direction relative to the interior circumference of the propellant tank and relative to the lateral axis.

13. The ring baffle of claim 11, wherein the spine section comprises a drainage area to support drainage along the lateral axis.

14. The ring baffle of claim 11, wherein the individual corrugated sections comprise an incline which is along a tangential direction relative to the interior circumference of the propellant tank, the incline to support drainage of a propellant to a drainage area which is between adjacent ones of the individual corrugated sections.

* * * * *